United States Patent [19]

Hashimoto et al.

[11] Patent Number: 5,773,157
[45] Date of Patent: Jun. 30, 1998

[54] MAGNETIC RECORDING MEDIUM WITH FUNGIRESISTANCE AND PROCESS FOR MANUFACTURING SAME

[75] Inventors: Eiichi Hashimoto, Mihara; Akihiro Horike, Hino, both of Japan

[73] Assignee: Teijin Limited, Osaka, Japan

[21] Appl. No.: 294,045

[22] Filed: Aug. 24, 1994

[30] Foreign Application Priority Data

Aug. 25, 1993 [JP] Japan .................................. 5-230767

[51] Int. Cl.$^6$ ..................................................... G11B 5/72
[52] U.S. Cl. ........................... 428/694 BP; 428/694 BN; 428/900; 428/907
[58] Field of Search ................................ 428/694 B, 694, 428/694 TS, 694 BN, 694 BP, 900, 907

[56] References Cited

U.S. PATENT DOCUMENTS 4,698,280 10/1987 Mine et al. .
5,028,497 7/1991 Somezawa et al. ..................... 428/694

FOREIGN PATENT DOCUMENTS 4105215 4/1992 Japan .

OTHER PUBLICATIONS

*Patent Abstracts of Japan*, unexamined applications, P field, vol. 18, No. 278, May 26, 1994 JPA 0644554.
*Database WPIL*, No. 92–296 511, Derwent Publications Ltd., London and JP–A–04 205 710 (Hitachi Maxwell K.K.) *Abstract only.*

*Database WPIL*, No. 92–296 510, Derwent Publications Ltd., London and JP–A–04 205 710 (Hitachi Maxwell K.K.) *Abstract only.*

*Primary Examiner*—Stevan A. Resan
*Attorney, Agent, or Firm*—Sughrue, Mion, Zinn, Macpeak & Seas, PLLC

[57] ABSTRACT

A magnetic recording medium excellent in fungiresistance and having high safety, lubrication and durability is provided, with the magnetic properties not being affected. An anti-fungus agent is added to the recording medium. The added anti-fungus agent is a compound (I) in an amount of 0.005 to 5.0% by weight of the magnetic coating layer:

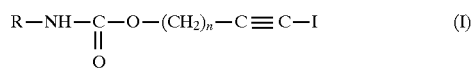

where R stands for $C_1$ to $C_6$ straight or branched alkyl, cyclohexyl or,

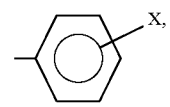

n is an integer of 1 or 2, and X stands for H, $CH_3$, Cl, Br or I.

7 Claims, No Drawings

MAGNETIC RECORDING MEDIUM WITH FUNGIRESISTANCE AND PROCESS FOR MANUFACTURING SAME

BACKGROUND OF THE INVENTION

1. Field of the Invention

The present invention relates to a magnetic recording medium with excellent fungiresistance as well as lubrication and durability and a process for manufacturing such a magnetic recording medium.

2. Description of the Related Art

A magnetic recording medium is manufactured by mixing and dispersing a magnetic powder, a lubricant and a binder with each other to form a magnetic coating material, and applying and drying the magnetic coating material onto a non-magnetic substrate to form a magnetic layer on the non-magnetic substrate. The binder comprises a thermoplastic or thermosetting resin, for example, synthetic resins such as vinyl chloride/vinyl acetate-based copolymer resins, polyurethane resins, cellulose derivatives, epoxy resins, polyvinyl butylals, synthetic rubber-based resins, acrylic resins, polyester resins, and the lubricant comprises, for example, an aliphatic acid or aliphatic acid ester, or a surfactant. This binder and this lubricant may contain a compound which is a nutrition source for fungi to accelerate growth of fungi.

On the other hand, magnetic recording media have been used and stored in various temperature and humidity environments as a result of a recent expansion of market of magnetic recording media. Thus, magnetic recording media are also used in a high humidity environment and it is noticed that fungi grow on the magnetic layer of the media during use or storage of the media. The fungi on the media may disadvantageously cause peeling of a magnetic layer, lowering of a flatness of a medium, contamination of the surface of a magnetic head, signal errors in a magnetic tape or disc, and like.

To prevent growth of fungi in magnetic recording media, there is proposed to incorporate an anti-fungus agent in a magnetic layer, see for example, U.S. Pat. Nos. 4,698,280, and 5,028,497 and Japanese Unexamined Patent Publication (Kokai) No. 04-105215.

Nevertheless, conventional magnetic recording media do not have a sufficient resistance to fungi.

The object of the present invention is to provide a magnetic recording medium excellent in fungiresistance and having sufficient lubrication and durability, without affecting the magnetic properties.

SUMMARY OF THE INVENTION

The present invention, in order to attain the above object, provides a magnetic recording medium comprising a non-magnetic substrate and a magnetic coating layer on the substrate, said magnetic coating layer comprising a ferromagnetic powder, a binder, and optionally an organic lubricant, said magnetic recording medium further containing a first compound represented by the following general formula (I) in an amount of 0.005 to 5.0% by weight of the magnetic coating layer:

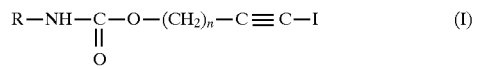

(I)

where R stands for $C_1$ to $C_6$ straight or branched alkyl, cyclohexyl or

n is an integer of 1 or 2, and X stands for H, $CH_3$, Cl, Br or I.

Preferably, the magnetic recording medium according to the present invention contains not only the first compound but also at least one second compound selected from the compounds represented by the following general formula (II) or (III), the total amount of said first and second compounds being 0.005 to 5.0% by weight of the magnetic coating layer:

$$A-SO_2-CHI_2 \quad \text{(II)}$$

where A stands for

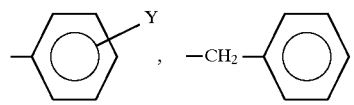

or cyclohexyl, Y stands for H, $C_1$ to $C_4$ straight or branched alkyl, Cl, Br or I;

(III)

where B stands for H, OH,

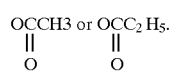

The present invention further provides a process for producing a magnetic recording medium as above, the process comprising preparing a non-magnetic substrate, preparing a coating material for a magnetic coating layer, and applying the coating material onto the non-magnetic substrate, wherein said first compound, optionally with a second compound, is added to a solution of a catalyst for cross-linking reaction of the binder and said solution is added to the coating material at a final stage of preparation of said coating material.

Since an anti-fungus agent has anti-fungi effect, the safety of an anti-fungus agent to a human body should be also considered. The present inventor investigated the mutagenesis of anti-fungus agents and found that an anti-fungus agent having a negative mutagneicis is preferred.

DETAILED DESCRIPTION OF THE INVENTION

In the compound represented by the formula (I), the $C_1$ to $C_6$ alkyl may be, for example, methyl, ethyl, propyl, isopropyl, n-butyl, isobutyl, t-butyl, hexyl, etc. It is preferred that R is propyl, isopropyl, n-butyl or halogenated phenyl wherein the halogen is chlorine, bromine or iodine. The compound represented by the formula (I) may be used alone or in combination.

Typical examples of the compound represented by the formula (I) include 3-iodo-2-propynyl-n-propyl carbamic acid, 3-iodo-2-propynyl-isopropyl carbamic acid, 3-iodo-2-propynyl-n-butyl carbamic acid, 3-iodo-2-propynylcyclohexyl carbamic acid, 3-iodo-2-propynyl-phenyl carbamic acid, 3-iodo-2-propynyl-p-tolyl carbamic acid, and 3-iodo-2-propynyl-p-chlorophenyl carbamic acid.

Typical examples of the compound represented by the formula (II) include phenyldiiodomethylsulfone, p-tolyldiiodomethysulfone, p-t-butylphenyldiiodomethylsulfone, p-chlorophenyldiiodomethylsulfone, cyclohexyldiiodomethylsulfone and benzyldiiodomethylsulfone.

Typical examples of the compound represented by the formula (III) include 1, 1,2-triiodopropene- 1,2,3,3-triiodoallylalcohol, 3-acetoxy-1,1,2-triiodopropene -1, and 3-propionyloxy-1,1,2-triiodopropene -1.

The requirements for an anti-fungus agent used for a magnetic recording medium generally include the following:

a high fungiresistance attained by a small amount of the agent;

a high safety to a human body;

a long lasting of fungiresistance;

no or little smell;

solubility in or compatibility with a solvent for preparing a magnetic coating material;

no or little deterioration in dispersion of a magnetic substance in the magnetic layer; and no or little affect on the magnetic properties. The compounds represented by the formulae (I) to (III) satisfy these requirements and provide a magnetic recording medium with high lubrication and durability.

The compound represented by the formula (I) should be incorporated in an amount of 0.005 to 5.0% by weight of the magnetic coating layer. If the amount is less than 0.005% by weight, the fungiresistance is not sufficient and, if the amount is more than 5.0% by weight, it is not preferred because the agent may ooze over the surface of the magnetic recording medium to contaminate a magnetic head or to adhere the medium with a magnetic head, causing an abnormal torque, and thus the durability of the medium is lowered. A preferred amount of the compound is 0.1 to 3.0% by weight.

The compound represented by the formula (II) and/or (III) may be preferably added with the compound represented by the formula (I) so that the variety of fungi to which the medium is resistant can increase. The amount of the added compound represented by the formula (II) and/or (III) may be in such an amount that the total amount of the compounds represented by the formula (I) and (II) and/or (III) is 0.005 to 5.0% by weight of the magnetic coating layer. It is not preferred to add too much anti-fungiresistant agents because of the same reasons as mentioned as above for the amount of the compound (I). A preferred amount of the total amount of the compounds represented by the formulae (I), (II) and/or (III) is 0.1 to 3.0% by weight.

The binder used in the magnetic recording medium of the present invention may be any one which is usually used in a coating-type magnetic recording medium and may be, for example, selected from polyurethane resins, polyester resins, polycarbonate resins, phenoxy resins, cellulose nitrate-based polymers, polybutylal resins, rubber-based resins such as NBR, vinyl chloride/vinyl acetate copolymers, vinylidene chloride copolymers, and polyamide resins. Among them, vinyl chloride/vinyl acetate copolymers, vinylidene chloride copolymers and polyurethane resins are preferred as binders since they may provide a magnetic recording medium with excellent fungiresistance and durability.

It is preferred that a polyisocyanate-based cross-linking agent is used in combination with the above resins. Such a polyisocyanate-based cross-linking agent may be, for example, diisocyanates such as tolylenediisocyanate, xylylenediisocyanate, hexametylenediisocyanate, or 4,4'-diphenylmethanediisocyanate, or an adduct of trimethylolpropane with 3 moles of tolylenediisocyanate (Coronate L, produced by Nippon Polyurethane Industry Co. Ltd.). The polyisocyanate-based cross-linking agent is preferably used in an amount of 2.0 to 10.0% by weight, particularly 3.0 to 7.0% by weight of the magnetic layer.

A combination of a vinyl chloride/vinyl acetate copolymer and a polyurethane resin, among the above binders, with a polyisocyanate-based cross-linking agent is preferred from the viewpoint of durability and lubrication.

The lubricant used in the magnetic layer may be any one which is known as a lubricant for a magnetic recording medium. For example, ethyl laurate, isopropyl myristinate, propoxyisopropyl myristinate, hexadecyl palmitate, butyl stearate, butoxyethoxyethyl stearate, oleyl oleate, diethyleneglycol dioleate, glycerine trioleate (olive oil), trimethylolpropane tricaprate and hexadecyl isostearate may be used.

Other lubricants include known surfactants, for example, higher aliphatic amines, higher aliphatic alcohols, and ethyleneoxide and/or propyleneoxide adducts of alkyl-substituted phenol. Further, long chain aliphatic acids such as lauric acid, myristic acid, palmitic acid, stearic acid and oleic acid may be also mentioned as examples of a useful lubricant.

The anti-fungus agent according to the present invention, when used in combination with the above organic lubricant, provides an improvement in the surface lubrication of a medium and, as a result, an improvement in durability can be obtained. That is, when the medium includes a lubricant of an organic compound which may be a nutrition source for fungi, the anti-fungus agent according to the present invention provides not only a fungiresistance but also a lubrication function when added to a magnetic layer so that the amount of lubricant to be added to the magnetic layer can be reduced. However, if no lubricant is used in combination with the anti-fungus agent according to the present invention, sufficient lubrication and durability cannot be obtained. Accordingly, it is considered that the anti-fungus agent according to the present invention exhibits an improved lubrication function as mentioned above as a result of a synergistic effect of the anti-fungus agent coexisting with the lubricant.

The magnetic layer may further include an abrasive such as α-alumina, chromium oxide, titanium oxide and Si—C, an anti-static agent such as carbonblack, a further lubricant such as molybdenum disulfide, graphite and a silicone oil, and a dispersing agent such as lecithin, a silane coupling agent and a titanium coupling agent.

The ferromagnetic powder used in the present invention may be any one which is usually used in a coating-type magnetic recording medium. Typical examples include $\gamma\text{-Fe}_2O_3$, Co-coated $\gamma\text{-Fe}_2O3$, $Fe_3O_4$, hexagonal barium ferrite and metal powders. Oxide magnetic powders may be also used including $CrO_2$ and a $CrO_2$ powders the surface of which is reduced to form a $Cr_2O_3$ coating layer. Among them, Co-coated $\gamma\text{-Fe}_2O_3$ is preferable from the viewpoint of productivity and cost. The shape of the magnetic powder may be various forms, for example, needle, particle, rice grain and plate forms. The average particle size of the magnetic powder is preferably 0.08 to 0.6 µm and the specific surface area of the magnetic powder is 15 to $70m^2/g$, preferably 18 to $50m^2/g$.

The magnetic recording medium of the present invention may be manufactured by mixing the anti-fungus agent or agents represented by the formulae (I), (II) and/or (III), a ferromagnetic powder, a binder, a lubricant and other additives in the presence of an adequate solvent in a ball mill, a sand mill or the like to form a magnetic coating material, and coating and drying the magnetic coating material on a non-magnetic substrate by a common coating method such as doctor blade, roll coating and gravure coating methods.

The anti-fungus agent or agents represented by the formulae (I), (II) and/or (III) may be added to the coating material in the following stages of preparation of the coating material;
  i) agent or agents may be added when a ferromagnetic powder, a dispersing agent and a binder are mixed in a solvent and thus anti-fungus agent is added to the coating material at an initial stage;
  ii) agent or agents may be added when an organic compound solution of a binder, a lubricant and/or a cross-linking agent is prepared and thus anti-fungus agent is added to the coating material at an intermediate stage;
  iii) agent or agents may be added when a solution of a catalyst for binder cross-linking reaction (an inorganic compound, etc.) is prepared and thus agent is added to the coating material at a final stage.

After intensive investigation, it was found that the above stage iii) addition is advantageous from the viewpoint of stability of a coating material, handling and process management.

That is, the above stage i) is an initial stage of preparing a coating material and therefore the rest of the stages take a long time, sometimes more than several weeks. Nevertheless, the anti-fungus agents represented by the formulae (I) to (III) disadvantageously react with active functional groups (e.g. OH, COOH, sulfonate, epoxy, halogen, acetyl, isocyanate, urethane, ester groups) of the binder, lubricant or cross-linking agent to gel or form a by-product. Such a reaction is not fast under normal conditions for forming a coating material (room temperature) but, if the process of preparing a coating material and/or the time period for storing a coating material after the agent is added are long, the side reaction gradually proceeds to cause deterioration of the material.

Nevertheless, in the cases where the anti-fungus agent is added, when a solution of a catalyst for a cross-linking reaction, mainly of an inorganic compound, is prepared, the anti-fungus agent is generally inactive or difficultly reactive with inorganic compounds, etc., which is preferred because of the resulting stability of a coating material and prevention of deterioration from by-product formation. Moreover, since the catalyst solution containing an anti-fungus agent is added to the coating material at almost the final stage of preparing the coating material, i.e., just before application of the coating material to a substrate, the time period for storing the coating material is shorter in this case so that by-product formation is less.

Further, in the above stage iii), the step of adding an anti-fungus agent is separated from the step of preparing a coating material and, therefore, handling and process management are easy.

Examples of such a catalyst for binder cross-linking reaction are acetyl acetonate complexes such as ferric acetyl acetonate $Fe(C_5H_7O_2)_3$, aluminum acetyl acetonate $Al(C_5H_7O_2)_3$, chromium acetyl acetonate $Cr(C_5H_7O_2)_3$, cobalt (II) acetyl acetonate $Co(C_5H_7O_2)_2 \cdot 2H_2O$, cobalt (III) acetyl acetonate $Co(C_5H_7O_2)_3$, copper acetyl acetonate $Cu(C_5H_7O_2)_2$ magnesium acetyl acetonate $Mg(C_5H_7O_2)_2$, manganese (II) acetyl acetonate $Mn(C_5H_7O_2)_2 \cdot 2H_2O$, manganese (III) acetyl acetonate $Mn(C_5H_7O_2)_3$, zinc acetyl acetonate $Zn(C_5H_7O_2)_2$, titanium (IV) oxyacetyl acetonate $TiO(C_5H_7O_2)_2$, and tin compounds such as di-n-butyl tin diacetate, di-n-butyl tin dilaurate and di-n-butyl tin mareate, with ferric acetyl acetonate, manganese (II) acetyl acetonate and di-n-butyl tin dilaurate being particularly preferred.

The catalyst for the binder cross-linking reaction is not limited to the above and may be varied depending on the reaction system.

Alternatively, the compounds represented by the formulae (I) to (III) may be applied onto a magnetic layer, which has already been coated and dried on a substrate, as a solution in methylethylketone, cyclohexanone or toluene or a mixture thereof by spin coating, roll coating, gravure coating or the like, or the magnetic recording medium may be dipped in such a solution, so as to incorporate the compounds into the magnetic layer. When the above method of incorporation is adopted, it is preferred that the compounds are incorporated in an amount of 0.001 to $0.5 g/m^2$, more preferably 0.004 to $0.2 g/m^2$. Less than $0.001 g/m^2$ of the compounds are not sufficient in fungiresistance and more than $0.5 g/m^2$ of the compounds may ooze onto the surface of the layer to cause head contamination and torque trouble.

Further, the anti-fungus agent, i.e., the compound represented by the formula (I), (II) or (III) may be incorporated in the recording medium not only in the ferromagnetic layer but as an underlying layer between the non-magnetic substrate and the ferromagnetic layer and/or as an overlying layer over the ferromagnetic layer. Even in such cases, the amount of the agents incorporated should be as mentioned above from the same reason. Incorporation of the agent in the ferromagnetic layer is most preferred.

The non-magnetic substrate used in the present invention may be a film, a sheet or the like made of, for example, polyesters such as polyethylene terephthalate, polyolefins such as polypropyrene, cellulose derivatives such as cellulose diacetate and cellulose triacetate, polycarbonates, polyvinyl chloride, polyimides, polyamides, polysulfones, polyethersulfones and the like.

It is preferred that the anti-fungus agent has a negative mutagenicis. In this respect, the anti-fungus agents, particularly 3-iodo-2-propynyl-n-butyl carbamic acid, etc. as represented by the formula (I), p-tolyldiiodometylsulfone, etc. as represented by the formula (II), and 2,3,3-triiodoallylalcohol etc. as represented by the formula (III) are preferably used because of a high level of safety to the human body, including negative metagenicis.

EXAMPLES

The present invention is further described in detail with reference to Examples. In the following Examples, "%" and "parts" are based on weight and the evaluation of a magnetic recording medium was conducted as below.

Fungiresistance test with mixed fungi

A fungiresistance test of a magnetic recording medium was carried out in accordance with JIS Z2911(1992) "Fungirestistance Test Method", for general industry products and synthetic resin products.

(1) Fungi under test
  *Aspergillus niger* IFO 6341
  *Penicillium citrinum* IFO 6352
  *Rhizopus oryzae* FERM S-7
  *Cladosporium cladosporioides* IFO 6348
  *Chaetomium globosum* ATCC 6205

(2) Test method
  i) A sample (a magnetic recording medium) was cut into a square of 3.0 cm×3.0 cm (test piece).
  ii) A sterilized laboratory dish was charged with a culture medium having the following composition, on which a test piece was placed and 0.5 ml of a mixed fungi suspension of was spread over the test piece. The laboratory dish was capped with a cap and kept under a temperature of 28°±2° C. and a humidity of 95 to 99%RH to cultivate the fungi for 4 weeks.
  iii) The growth of the fungi on the surface of the test piece was observed by naked eyes after 2 weeks and 4 weeks.

(3) Composition of culture medium

| Ammonium nitrate | 3.0 g |
| --- | --- |
| Monopotassium phosphate | 1.0 g |
| Magnesium sulfate | 0.5 g |
| Potassium chloride | 0.25 g |
| Ferrous surfate | 0.002 g |
| Agar | 25 g |
| Purified water | 1.000 ml |

(4) Expression of results of test

The observed fungiresistance was classified into the following three grades as shown in Table 1.

The all results of the fungiresistance tests shown in Examples are those after the 4 weeks cultivation.

TABLE 1

| Expression of Fungiresistance | Growth of hyphae |
| --- | --- |
| 3 | No growth of hyphae is observed in the inoculated portion of the test piece. |
| 2 | The area where the growth of hyphae is observed in the inoculated portion of the test piece does not exceed ⅓ of the total area. |
| 1 | The area where the growth of hyphae is observed in the inoculated portion of the test piece exceeds ⅓ of the total area. |

Fungiresistance test with a single fungus

A fungiresistance test of a magnetic recording medium with respect to a single fungus was carried out in accordance with the following method. The essence of the test followed JIS Z2911(1992) "Fungiresistance Test Method".

(1) Fungi under test
  *Aspergillus niger* IFO 6341
  *Penicillium citrinum* IFO 6352
  *Fusarium proliferatum* IFO 9965
  *Glioclagium virens* IFO 6355

(2) Test method
  i) A sample (a magnetic recording medium) was cut into a square of 3.0 cm×3.0 cm (test piece).
  ii) A sterilized laboratory dish was charged with a JIS Sabouraud culture medium having the following composition, on which a test piece was placed and 0.5ml of a dispersion of the fungi under test was sprinkled uniformly over the test piece. The laboratory dish was capped and kept under a temperature of 28°±2° C. and a humidity of 95 to 99%RH to cultivate the fungi for 4 weeks.
  iii) The growth of the fungi on the surface of the test piece was observed by naked eyes after 2 weeks and 4 weeks.

(3) Composition of culture medium

| (1/10 JIS Sabouraud culture medium) | |
| --- | --- |
| Glucose | 4 g |
| Peptone | 1 g |
| Agar | 25 g |
| Ionized water | 1.000 ml |

(4) Expression of results of test

The observed fungiresistance was classified into the following three grades as shown in Table 1.

The all results of the fungiresistance tests shown in Examples are those after the 4 weeks cultivation.

Lubrication
  i) Using a belt-driving drive, a rotation speed was set to 1000 rpm (three times the normal speed) and the weight of a magnetic head was set to about two times the normal weight.
  ii) A magnetic recording medium to be tested was inserted into the drive and driven under room temperature for 4 hours.
  iii) The surface of the medium and the surface of the magnetic head slider were observed and evaluated with the following four grades in Table 2.

TABLE 2

| Grade | Surface of medium | Surface of head |
| --- | --- | --- |
| 4 | No trace of head slider | No debris |
| 3 | Slight trace of head slider | Slight debris |
| 2 | Significant trace of head slider | Significant debris |
| 1 | Peeling of coating layer | Head clog | iv) Five media were tested and the grades of the five evaluations were added together (total 20 maximum).

Durability
  i) A commercially available drive (e.g., YD-380T) was set in a thermostatic chamber.
  ii) The thermostatic chamber was operated under the following cyclic temperature and humidity conditions.

| 1) 25° C., 80% RH | 1.0 hour |
| --- | --- |
| 2) lowering the temperature | 1.0 hour |
| 3) 5° C. (no humidity control) | 3.0 hour |
| 4) Raising the temperature | 3.0 hour |
| 5) 60° C., 20% RH | 2.0 hour |
| 6) Lowering the temperature | 2.0 hour |

After the stage 6), return to the stage 1) and repeat the cycle.

iii) A test medium was inserted in the drive and the drive was continuously driven under the above cyclic temperature and humidity conditions.
  iv) The driving was continued until significant slid traces appear on the surface of the medium and that period in the unit of 10'passes was considered to be the measured durability.
  v) Prior to the above temperature and humidity cycle test, the medium was subjected to recording and reading certain signals and the read signal was considered to be 100%. After the durability test, the medium was again subjected to reading the signals so as to check the level of the lowered signals. The checked level of the signals was expressed as the "signal remain", in percent, in comparison with the original signal level. A practically useful medium should have a signal remain of 80% or more after 5,000,000 passes.

(Working examples 1–3 and Comparative examples 1–3)

Magnetic coating materials having the following compositions were prepared by dispersing the ingredients in a sand mill and adding a cross-linking polyisocyanate and a catalyst solution thereto. Anti-fungus agents as shown in Table 3 were mixed in the catalyst solution in a coating material in an amount as shown in Table 3 (the amount of the agent being based on the weight of the magnetic layer).

|  | (parts) |
|---|---|
| Ferromagnetic powder: Co-γ-$Fe_2O_3$ | 60.0 |
| Lubricant: | |
| Olive oil | 0.5 |
| Hexadecyl palmitate | 2.5 |
| Propoxyisopropyl myristate | 1.5 |
| Lauric acid | 0.2 |
| Dispersing agent: lecithin | 2.0 |
| Abrasive: α-alumina | 5.0 |
| Anti-static agent: carbonblack | 5.5 |
| Vinyl chloride/vinyl acetate copolymer: | |
| MR-110 (Nippon Zeon Co. Ltd.) | 7.0 |
| TA-SC (Nisshin Chemical Industry Co. Ltd.) | 5.0 |
| Polyurethane resin: Estane 5701 (B F Goodrich) | 7.0 |
| Polyisocyanate: | |
| Coronate L (Nippon polyurethane Industry Co. Ltd) | 3.8 |
| Total | 100.0 |

The obtained coating materials were uniformly applied onto the both sides of a 75 μm-thick polyester film so as to have a dried layer thickness as shown in Table 3. The applied coating layers were dried, calendar treated and heat cured, followed by punching to discs with a diameter of 3.5 inches to obtain floppy discs for high density recording.

The floppy discs were then subjected to the fungiresistance test and the lubrication and durability tests. The results are shown in Table 3.

As shown in Table 3, the magnetic recording media containing a compound represented by the general formula (I) (hereinafter referred to as "compound (I)") in combination with at least one compound represented by the general formula (II) and (III) (hereinafter referred to as "compound (II)" and "compound (III)" respectively), in an amount of 0.005 to 5.0% by weight, in accordance with the present invention (in Working examples 1 to 3), had excellent and better fungiresistance in comparison with a medium with no anti-fungus agent (in Comparative example 1) and media with a single compound (II) or (III) (in Comparative examples 2 and 3).

Furthermore, when a compound (I) and a compound (II) or (III) were combined with each other (in Working examples 1 and 2), the fungiresistance in the single fungus test was excellent and better than the case where only a compound (I) was used (in Working example 3).

Also, a significant improvement in lubrication and durability can be seen.

TABLE 3

| | | | | | | | | | Fungiresistance | | | | | |
| | | | | | | | | | | | Single fungus | | | |
| | Thick- | Anti-fungus agent | | | | | | Mixed | As- | Peni- | Fusa- | Glio- | | Dura- |
| | ness of | Compound (I) | | Compound (II) | | Compound (III) | | Total | fungi | per- | cillium | rium | cla- | Lub- | bility |
| Example | coating (μm) | | Amount (%) | | Amount (%) | | Amount (%) | amount (%) | (JIS-Z 2911) | gillus niger | citri-num | prolif-eratum | gium virens | rica-tion | ($\times 10^4$ pass) |
| Wo. ex. 1 | 1.0 | 3-iodo-2-propynyl-n-butyl carbamic acid | 0.3 | p-tolyl-diiodo-methyl-sulfone | 0.2 | — | — | 0.5 | 3 | 3 | 3 | 3 | 3 | 19 | 1,820 |
| Wo. ex. 2 | 1.0 | 3-iodo-2-propynyl-n-butyl carbamic acid | 0.4 | — | — | 2,3,3-triiodo-allyl-alcohol | 0.1 | 0.5 | 3 | 3 | 3 | 3 | 2 | 17 | 1,660 |
| Wo. ex. 3 | 1.0 | 3-iodo-2-propynyl-n-butyl carbamic acid | 0.5 | — | — | — | — | 0.5 | 3 | 3 | 3 | 2 | 2 | 17 | 1,560 |
| Com. ex. 1 | 1.0 | — | — | — | — | — | — | — | 1 | 1 | 1 | 1 | 1 | 12 | 980 |
| Com. ex. 2 | 1.0 | — | — | p-tolyl-diiodo-methyl-sulfone | 0.5 | — | — | 0.5 | 2 | 2 | 2 | 1 | 3 | 8 | 570 |

TABLE 3-continued

| | | Anti-fungus agent | | | | | Fungiresistance | | | | | | |
| | | | | | | | | Single fungus | | | | | |
| | Thick-ness of | Compound (I) | Compound (II) | Compound (III) | | Total | Mixed fungi | As-per-gillus | Peni-cillium | Fusa-rium | Glio-cla-gium | | Dura-bility |
| Ex-ample | coating (μm) | Amount (%) | Amount (%) | | Amount (%) | amount (%) | (JIS-Z 2911) | niger | citri-num | prolif-eratum | virens | Lub-rica-tion | (×10⁴ pass) |
|---|---|---|---|---|---|---|---|---|---|---|---|---|---|
| Com. ex. 3 | 1.0 | — | — — | — | 2,3,3-triiodo-allyl-alcohol 0.5 | 0.5 | 1 | 2 | 3 | 1 | 1 | 10 | 780 |

(Working examples 4–6 and Comparative examples 4–8)

Magnetic coating materials having the following compositions were prepared by dispersing the ingredients in a sand mill and adding a cross-linking polyisocyanate and a catalyst solution thereto. Anti-fungus agents as shown in Table 4 were mixed in the catalyst solution in a coating material in an amount as shown in Table 4.

| | (parts) |
|---|---|
| Ferromagnetic powder: γ-Fe₂O₃ | 60.0 |
| Lubricant: | |
| Butoxyethoxyethyl stearate | 1.00 |
| Hexadecyl palmitate | 2.55 |
| Isooctyl stearate | 0.30 |
| Lauric acid | 0.25 |
| Dispersing agent: | |
| Lecithin | 0.20 |
| Silane coupling agent | 0.50 |
| Abrasive: α-alumina | 4.50 |
| Anti-static agent: carbonblack | 5.20 |
| Vinyl chloride/vinyl acetate copolymer: | |
| MR-110 (Nippon Zeon Co. Ltd.) | 3.50 |
| TA-5C (Nisshin Chemical Industry Co. Ltd.) | 6.00 |

-continued

| | (parts) |
|---|---|
| Polyurethane resin: Estane 5701 (B F Goodrich) | 7.50 |
| Polyisocyanate: | |
| Coronate L(Nippon polyurethane Industry Co. Ltd.) | 4.50 |
| Total | 100.0 |

The coating materials were uniformly applied onto the both sides of a 75 μm-thick polyester film so as to have a dried layer thickness as shown in Table 3. The applied coating layers were treated as in Working example 1, followed by punching to discs with a diameter of 5.25 inches to obtain floppy discs for high density recording.

The floppy discs were subjected to the fungiresistance test and the lubrication and durability tests. The results are shown in Table 4.

As shown in Table 4, the magnetic recording media containing the anti-fungus agent in accordance with the present invention (in Working examples 4 to 6), had excellent and better fungiresistance as well as excellent lubrication and durability in comparison with media with a lesser amount of the same anti-fungus agent (in Comparative examples 4 to 6) or a medium with a commercially available anti-fungus agent other than the compound (I) (in Comparative examples 7 and 8).

TABLE 4

| | Thick-ness of | Anti-fungus agent | | | | | | Total | Fungi-resistance | | Durability |
| Example | coating (μm) | Compound (I) | Amount (%) | Compound (II) or (III) | Amount (%) | Other compound | Amount (%) | amount (%) | (Mixed fungi) | Lubrication | (×10⁴ pass) |
|---|---|---|---|---|---|---|---|---|---|---|---|
| Wo. ex. 4 | 2.4 | 3-iodo-2-propynyl-n-butyl carbamic acid | 0.005 | p-tolyldiiodo-methylsulfone | 0.003 | — | — | 0.008 | 2 | 15 | 1,400 |
| Wo. ex. 5 | 2.4 | 3-iodo-2-propynyl-n-butyl carbamic acid | 0.030 | p-tolyldiiodo-methylsulfone | 0.030 | — | — | 0.060 | 2 | 14 | 1,350 |
| Wo. ex. 6 | 2.4 | 3-iodo-2-propynyl-n-butyl carbamic acid | 0.100 | 2,3,3-triiodo-allylalcohol | 0.050 | — | — | 0.150 | 3 | 17 | 1,510 |
| Com. ex. 4 | 2.4 | 3-iodo-2- | 0.003 | — | — | — | — | 0.003 | 1 | 13 | 1,040 |

TABLE 4-continued

| Example | Thickness of coating (μm) | Anti-fungus agent | | | | | | Total amount (%) | Fungi-resistance (Mixed fungi) | Lubrication | Durability (×10⁴ pass) |
|---|---|---|---|---|---|---|---|---|---|---|---|
| | | Compound (I) | Amount (%) | Compound (II) or (III) | Amount (%) | Other compound | Amount (%) | | | | |
| Com. ex. 5 | 2.4 | propynyl-n-butyl carbamic acid 3-iodo-2-propynyl-n-butyl carbamic acid | 0.002 | p-tolyldiiodo-methylsulfone | 0.001 | — | — | 0.003 | 1 | 11 | 880 |
| Com. ex. 6 | 2.4 | 3-iodo-2-propynyl-n-butyl carbamic acid | 0.002 | 2,3,3-triiodo-allylalcohol | 0.001 | — | — | 0.003 | 1 | 12 | 940 |
| Com. ex. 7 | 2.4 | — | — | — | — | 2-(4-thiazolyl)-benzimidazol | 0.008 | 0.008 | 1 | 11 | 940 |
| Com. ex. 8 | 2.4 | — | — | 2,3,3-triiodo-allylalcohol | 0.050 | 2-(4-thiazolyl)-benzimidazol | 0.100 | 0.150 | 1 | 11 | 980 |

(Working examples 7–9 and Comparative examples 9–12)

Magnetic coating materials were prepared and applied onto non-magnetic substrates in the same manner as in working example 1 using the anti-fungus agents in the amounts as shown in Table 5 to make magnetic layers having the dry thicknesses as shown in Table 5. Dried and treated as in Working example 1, the floppy discs for high density recording and having a 3.5 inch diameter were obtained.

The obtained floppy discs were subjected to the fungiresistance test and the tests for lubrication, durability and signal remain after 5×10⁶ passes of the floppy discs.

The results are shown in Table 5.

As can be seen in Table 5, the magnetic recording media containing an anti-fungus agent in an adequate amount in accordance with the present invention (in Working examples 7 to 9), had an excellent fungiresistance as well as excellent lubrication, durability and signal remain. In contrast, the media with the anti-fungus agent in an amount larger than that defined in accordance with the present invention (in Comparative examples 9 and 10) had, due to contamination of the magnetic head, etc., inferior lubrication and durability, to thereby have a signal remain less than 80%. Thus, these media are not suitable for use in practice.

In Comparative example 11, a commercially available anti-fungus agent other than the agents of the present invention was used in an amount larger than that defined in accordance with the present invention. In Comparative example 12, a combination of an anti-fungus agent of the present invention and a commercially available anti-fungus agent other than the agents of the present invention was used in a total amount larger than that defined in accordance with the present invention.

As a result, the fungiresistance was not sufficient even though a large amount of the agent was used in Comparative example 11, and the lubrication, durability and signal remain were inferior in Comparative examples 11 and 12.

TABLE 5

| Example | Thickness of coating (μm) | Anti-fungus agent | | | | | | Total Amount (%) | Fungi-resistance (mixed fungi) | Lubrication | Durability | |
|---|---|---|---|---|---|---|---|---|---|---|---|---|
| | | Compound (I) | Amount (%) | Compound (II) or (III) | Amount (%) | Other compound | Amount (%) | | | | (×10⁴ pass) | Signal remain after 5 × 10⁶ pass (%) |
| Wo. ex. 7 | 1.0 | 3-iodo-2-propynyl-n-butyl carbamic acid | 1.2 | 2,3,3-triiodoallyl-alcohol | 0.5 | — | — | 1.7 | 3 | 18 | 1,660 | 91 |
| Wo. ex. 8 | 1.0 | 3-iodo-2-propynyl-n-butyl carbamic acid | 3.0 | 2,3,3-triiodoallyl-alcohol | 1.6 | — | — | 4.6 | 3 | 14 | 1,250 | 86 |
| Wo. ex. 9 | 1.0 | 3-iodo-2- | 4.5 | — | — | — | — | 4.5 | 3 | 14 | 1,200 | 85 |

TABLE 5-continued

| Example | Thickness of coating (μm) | Compound (I) | Amount (%) | Compound (II) or (III) | Amount (%) | Other compound | Amount (%) | Total Amount (%) | Fungiresistance (mixed fungi) | Lubrication | Durability (×10⁴ pass) | Signal remain after 5 × 10⁶ pass (%) |
|---|---|---|---|---|---|---|---|---|---|---|---|---|
| Com. ex. 9 | 1.0 | propynyl-n-butyl carbamic acid 3-iodo-2-propynyl-n-butyl carbamic acid | 5.5 | — | — | — | — | 5.5 | 3 | 8 | 940 | 75 |
| Com. ex. 10 | 1.0 | 3-iodo-2-propynyl-n-butyl carbamic acid | 4.5 | p-tolyl-diiodomethyl-sulfone | 1.0 | — | — | 5.5 | 3 | 7 | 680 | 68 |
| Com. ex. 11 | 1.0 | — | — | — | — | 2-(4-thiazolyl)-benzimidazol | 5.5 | 5.5 | 2 | 7 | 520 | 69 |
| Com. ex. 12 | 1.0 | 3-iodo-2-propynyl-n-butyl carbamic acid | 3.5 | — | — | 2-(4-thiazolyl)-benzimidazol | 2.0 | 5.5 | 3 | 10 | 920 | 71 |

(Working examples 10–14 and Comparative examples 13–15)

Floppy discs were prepared in the same manner as in Working example 1 except that the used anti-fungus agents, the amounts thereof and the dry thicknesses of the magnetic layers were changed to as shown in Table 6.

The fungiresistance, lubrication and durability of the obtained floppy discs were examined.

The results are shown in Table 6.

As seen in Table 6, the media in accordance with the present invention had excellent fungiresistance, lubrication and durability.

TABLE 6

| Example | Compound | Amount (%) | Fungiresistance (mixed fungi) | Lubrication | Durability (×10⁴ pass) | Thickness of coating (μm) |
|---|---|---|---|---|---|---|
| Wo. Ex. 10 | 3-iodo-Z-propynyl-n-butyl carbamic acid n—$C_4H_9NHCO_2CH_2C\equiv C\text{-}I$ | 0.2 | 2 | 15 | 1,090 | 1.0 |
| Wo. Ex. 11 | 3-iodo-2-propynyl-n-butyl carbamic acid n—$C_4H_9NHCO_2CH_2C\equiv C\text{-}I$ | 1.0 | 3 | 20 | 1,300 | 1.0 |
| Wo. Ex. 12 | 3-iodo-Z-propynyl-n-butyl carbamic acid n—$C_4H_9NHCO_2CH_2C\equiv C\text{-}I$ | 3.0 | 3 | 16 | 1,800 | 1.0 |
| Wo. Ex. 13 | 3-iodo-2-propynyl-cyclohexyl carbamic acid  | 0.5 | 3 | 18 | 1,200 | 1.0 |
| Wo. Ex. 14 | 3-iodo-2-propynyl-p-chlorophenyl carbamic acid 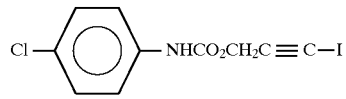 | 0.7 | 3 | 17 | 1,450 | 1.0 |

TABLE 6-continued

| Example | Anti-fungus agent Compound | Amount (%) | Fungiresistance (mixed fungi) | Lubrication | Durability ($\times 10^4$ pass) | Thickness of coating ($\mu$m) |
|---|---|---|---|---|---|---|
| Com. ex. 13 | 2-(4-thiazolyl)benzimidazol | 4.0 | 2 | 6 | 470 | 1.0 |
| Com. ex. 14 | 2-bromocinnamic aldehyde | 2.5 | 1 | 8 | 620 | 1.0 |
| Com. ex. 15 | N-N-dimethyl-N'-phenyl-N'-fluorodichloromethylthiosurfamide | 3.0 | 1 | 7 | 520 | 1.0 |

(Working examples 15–22 and Comparative examples 16–18)

Magnetic coating materials having the following composition were prepared in the same manner as in Working example 1.

|  | (parts) |
|---|---|
| Ferromagnetic powder: Co-$\gamma$-Fe$_2$O$_3$ | 60.0 |
| Lubricant: | |
| LUB-1 or LUB-2 in Table 7 | 5.0 |
| Dispersing agent: lecithin | 1.5 |
| silane coupling agent | 0.5 |
| Abrasive: $\alpha$-alumina | 4.5 |
| Anti-static agent: carbonblack | 5.0 |
| Vinyl chloride/acetate copolymer: | |
| MR-110 (Nippon Zeon | 3.5 |
| TA-5C (Nisshin Chemical Industry Co. Ltd.) | 5.2 |
| Polyvinylidene chloride: | |
| Saran F-216 (Asahi Chemical Industries Co. Ltd.) | 2.8 |
| Polyurethane resin: Estane 5701 (B F Goodrich) | 6.5 |
| Polyisocyanate: | |
| Coronate L(Nippon polyurethane Industry Co. Ltd.) | 5.5 |
| Total | 100.0 |

The lubricants had the compositions LUB-1 and LUB-2 as shown in Table 7 and were used in amounts as shown in Table 8.

TABLE 7

Compositions of lubricants (parts by weight)

| Ingredients | LUB-1 | LUB-2 |
|---|---|---|
| Olive oil | — | 1.0 |
| Hexadecyl palmitate | 2.5 | 3.0 |
| Propoxyisopropyl myristate | — | 0.8 |
| Oleyl oleate | 1.5 | — |
| Isooctyl stearate | 0.7 | — |
| Lauric acid | — | 0.2 |
| Myristic acid | 0.3 | — |
| Total | 5.0 | 5.0 |

The anti-fungus agents were the compounds as shown in Table 8 and were used in amounts as shown in Table 8 (the amount being based on the weight of the magnetic layer).

The magnetic coating materials were applied onto both sides of a 75 $\mu$m thick polyester film to have a dry thickness of the coating layers as shown in Table 8. Dried and treated as in Working example 1, the coated films were punched to make 3.5 inch floppy discs for high density recording.

The fungiresistance, lubrication and durability of the obtained floppy discs were examined.

The results are shown in Table 8.

As seen in Table 8, when the anti-fungus agent of the present invention was used, the lubrication of the medium was improved so that the amount of the lubricant used can be reduced. As a result, the amounts of the magnetic powder and binder to be incorporated can be selected in a wider range, which is advantageous for the performance of the recording medium, such as the electromagnetic properties. Moreover, when the anti-fungus agent of the present invention was added to the medium in the presence of a conventional lubricant, a synergistic effect of improved lubrication can be obtained so that the lubrication between the medium and the magnetic head and the durability of the recording medium are improved.

v) The dried matter in the aluminum container was precisely weighed to determine the percentage of the extraction from the coating layer.

TABLE 8

| Example | Thickness of coating (μm) | (A) Anti-fungus agent Compound | Amount (%) | (B) Lubricant Composition | Amount (%) | (A + B) amount (%) | Fungi-resistance (mixed fungi) | Lubrication | Durability (×10⁴ pass) |
|---|---|---|---|---|---|---|---|---|---|
| Wo. ex. 15 | 1.7 | 3-iodo-2-propynyl-n-butyl carbamic acid | 1.0 | LUB-1 | 5.0 | 6.0 | 3 | 17 | 1,610 |
| Wo. ex. 16 | 1.7 | 3-iodo-2-propynyl-n-butyl carbamic acid | 1.0 | LUB-1 | 4.0 | 5.0 | 3 | 20 | 2,030 |
| Wo. ex. 17 | 1.7 | 3-iodo-2-propynyl-n-butyl carbamic acid | 1.0 | LUB-1 | 3.0 | 4.0 | 3 | 18 | 1,720 |
| Wo. ex. 18 | 1.7 | 3-iodo-2-propynyl-n-butyl carbamic acid | 1.0 | LUB-1 | 2.0 | 3.0 | 3 | 14 | 1,350 |
| Com. ex. 16 | 1.7 | — | — | LUB-1 | 5.0 | 5.0 | 1 | 13 | 1,090 |
| Wo. ex. 19 | 1.7 | ① 3-iodo-2-propynyl-n-butyl carbamic acid ② p-tolyldiiodo-methylsulfone | 0.2 0.2 | LUB-2 | 4.6 | 5.0 | 3 | 16 | 1,560 |
| Wo. ex. 20 | 1.7 | ① 3-iodo-2-propynyl-n-butyl carbamic acid ② p-tolyldiiodo-methylsulfone | 0.2 0.2 | LUB-2 | 2.6 | 3.0 | 3 | 14 | 1,400 |
| Com. ex. 17 | 1.7 | — | — | LUB-2 | 5.0 | 5.0 | 1 | 13 | 1,090 |
| Wo. ex. 21 | 1.7 | ① 3-iodo-2-propynyl-n-butyl carbamic acid ② 2,3,3-triiodo-allylalcohol | 0.5 0.2 | LUB-2 | 4.3 | 5.0 | 3 | 17 | 1,660 |
| Wo. ex. 22 | 1.7 | ① 3-iodo-2-propynyl-n-butyl carbamic acid ② 2,3,3-triiodo-allylalcohol | 0.5 0.2 | LUB-2 | 2.5 | 3.2 | 3 | 13 | 1,400 |
| Com. ex. 18 | 1.7 | — | — | LUB-2 | 5.0 | 5.0 | 1 | 12 | 1,040 |

(Working example 23 and Comparative examples 19–23)

Magnetic coating materials were prepared in the same manner as in Working example 1, but the anti-fungus agent used was 3-iodo-2-propynyl-n-butyl carbamic acid in an amount as shown in Table 9, which was added in the method as shown in Table 9.

The obtained magnetic coating materials were applied uniformly onto one side of a 75 μm-thick polyester film to have a dry layer thickness of about 1.5 μm. The temperature of drying after the application was one of two levels, 90° C. and 110° C., as shown in Table 9.

Immediately after the drying, the coating layer was peeled from the coated film and the percent gel of the coating layer was determined in the following method.

i) A certain amount of the peeled coating layer was weighed in an Erlenmeyer flask.
ii) A certain amount of tetrahydrofuran (THF) was added into the flask and extraction was conducted with the flask in a 60° C. warm water bath with supersonic wave being applied thereto for 60 minutes.
iii) The solution was filtered to remove the non-dissolved matter such as magnetic powder and a filtrate dissolved in THF was obtained in an aluminum container.
iv) The THF was evaporated by heating the aluminum container on a hot plate to about 120° C. and the contents of the aluminum container were then dried under a reduced pressure at about 50° C. in a vacuum dryer.

vi) The gel fraction of the coating layer by the cross-linking reaction was calculated by using the percentage of the extraction and the composition of the coating layer.

The results are shown in Table 9.

In Working example 23, the anti-fungus agent was dissolved in a 2%-solution of a catalyst for cross-linking reaction, ferric acetyl acetonate $Fe(C_5H_7O_2)_3$, in cyclohexanone, and the solution was added to the magnetic coating material at a final stage of its preparation. The amount of the catalyst was as low as 0.05% or less based on the weight of the dried magnetic coating layer. In Working example 23 the percent gel did not increase, in comparison with the case where no anti-fungus agent was added (in Comparative example 23).

When the anti-fungus agent was dissolved in a 15% solution of polyurethane (Estane 5701) in cyclohexanone, the percent gel did not increase (in Comparative example 19).

When the anti-fungus agent was dissolved in a 20% solution of vinyl chloride/vinyl acetate copolymer (MR-110) in cyclohexanone (in Comparative example 20), the percent gel decreased. It was considered that the active functional groups of MR-110, for example, OH, $SO_3K$, epoxy, etc., reacted with the anti-fungus agent so that the cross-linking reaction between MR-110 and Coronate L did not proceed sufficiently.

When the anti-fungus agent was dissolved in a 20% solution of cross-linking agent (Coronate L) in cyclohexanone/ethyl acetate (ratio of solvents: 11/1) (in Comparative example 21), the percent gel decreased, so that the cross-linking reaction was affected.

In Comparative example 22, the anti-fungus agent was added to a solvent together with the magnetic powder, etc. and the percent gel was satisfactory. However, this case is not preferred since the cross-linking reaction would be affected if the time period for storing the coating material is long.

If the anti-fungus agent is dissolved in a binder, the effect thereof is different depending on the type of the binder. It is therefore not practical to dissolve the anti-fungus agent in a binder, since a mixed solution of various binders is usually used in the process of preparing a magnetic coating material.

It is concluded from Table 9 that the anti-fungus agent is preferably dissolved in a solution of a catalyst for cross-linking reaction and be added to the magnetic coating material at a final stage of preparation thereof. This conclusion was made from consideration of the effects of the anti-fungus agent on the cross-linking reaction, the problems in the process of preparing the magnetic coating material, and other items.

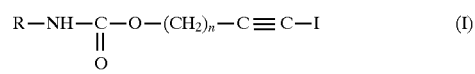

where R stands for $C_1$ to $C_6$ straight or branched alkyl, cyclohexyl or

n is an integer of 1 or 2, and X stands for H, $CH_3$, Cl, Br or I, wherein said first compound is incorporated in said magnetic layer.

2. A magnetic recording medium according to claim 1 wherein said magnetic recording medium further contains at least one second compounds selected from the compounds represented by the following general formulae (II) and (III), the total amount of said first and second compounds being 0.005 to 5.0% by weight of the magnetic coating layer:

$$A-SO_2-CHI_2 \quad (II)$$

TABLE 9

| Example | Anti-fungus agent 3-iodo-2-propynyl-n-butyl carbamic acid | | Method of preparing coating material | gel fraction (%) | | Affect of agent to cercent gel of coating | Problem on Process of Manufacturing Coating Material | Final judge |
|---|---|---|---|---|---|---|---|---|
| | Amount (%) | Addition method | | dry 90° C. | dry 110° C. | | | |
| Wo. ex. 23 | 0.5 | Dissolved in 2% solution of cross-linking catalyst $Fe(C_5H_7O_2)_3$ in cyclohexanone | Final stage incorporation | 48.0 | 59.7 | no | no | A |
| Com. ex. 19 | 0.5 | Dissolved in 15% solution of polyurethane (Estan5701) in cyclohexanone | Each binder is added in intermediate stage of diluting | 48.9 | 60.6 | no | Impossible to handle as a mixed solution of binders | B |
| Com. ex. 20 | 0.5 | Dissolved in 20% solution of Vinyl chloride-acetate copolymer (MR-10) in cyclohexanone | | 39.6 | 44.4 | yes | | C |
| Com. ex. 21 | 0.5 | Dissolved in 20% solution of cross-linking agent (Corronate L) in cyclohexanone/ethyl acetate (11/1) | Final stage incorporation | 38.1 | 53.6 | yes | Not practical due to deterioration when time passes | C |
| Com. ex. 22 | 0.5 | Added to cyclohexanone in combination with magnetic powder | Initial stage incorporation | 46.6 | 59.0 | no | | C |
| Com. ex. 23 | — | — | Normal method | 47.0 | 60.1 | — | — | — |

Note):
A: good,
B: poor,
C: not practical

We claim:

1. A magnetic recording medium comprising a non-magnetic substrate and a magnetic coating layer on the substrate, said magnetic coating layer comprising a ferromagnetic powder and a binder, said magnetic recording medium further containing a first compound represented by the following general formula (I) in an amount of 0.005 to 5.0% by weight of the magnetic coating layer:

where A stands for

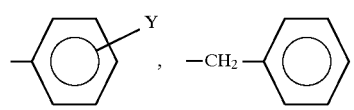

or cyclohexyl, Y stands for H, $C_1$ to $C_4$ straight or branched alkyl, Cl, Br or I;

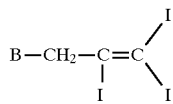 (III)

where B stands for H, OH, $OCCH_3$ or $OCC_2H_5$ wherein said at least one second compound is incorporated in said magnetic layer.

3. A magnetic recording medium according to claim 1 wherein the amount of said first compound is in a range of 0.1 to 3.0% by weight.

4. A magnetic recording medium according to claim 2 wherein said total amount of said first and second compounds is in a range of 0.1 to 3.0% by weight.

5. A magnetic recording medium according to claim 1 wherein said magnetic coating layer further contains an organic lubricant.

6. A magnetic recording medium according to claim 2 wherein said magnetic coating layer further contains an organic lubricant.

7. A magnetic recording medium according to claim 2 whereub said first and second compounds have a negative mutagenicis.

* * * * *